US012738130B1

(12) United States Patent
Sweetland

(10) Patent No.: US 12,738,130 B1
(45) Date of Patent: Sep. 15, 2026

(54) SYSTEM AND METHOD FOR AUTOMATICALLY LOADING AND PROCESSING MEDIA IN MEDIA CASSETTES

(71) Applicant: Cardtronics USA, Inc., Atlanta, GA (US)

(72) Inventor: Gareth Charles Sweetland, Dundee (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/172,880

(22) Filed: Apr. 8, 2025

(51) Int. Cl.
*G07F 19/00* (2006.01)
*G06K 7/14* (2006.01)

(52) U.S. Cl.
CPC .......... *G07F 19/20* (2013.01); *G06K 7/1417* (2013.01)

(58) Field of Classification Search
CPC .......................... G07F 19/20; G06K 7/1417
See application file for complete search history.

(56) References Cited

U.S. PATENT DOCUMENTS

2017/0066600 A1* 3/2017 Nakanishi .............. G07D 11/23
2017/0098134 A1 4/2017 Jones et al.
2024/0331484 A1 10/2024 Jamieson

OTHER PUBLICATIONS

European Search Report for European Application No. EP 26 16 5738, Completed on Jul. 15, 2026.

* cited by examiner

*Primary Examiner* — Matthew Mikels
(74) *Attorney, Agent, or Firm* — Notaro, Michalos & Zaccaria P.C.; John S. Economou

(57) ABSTRACT

A system and method automatically loads and processes media in a media cassette at a terminal. The media cassette is loaded with a predetermined amount and type of media having a common dimension. An information sheet is generated having a same dimension as the common dimension of the media. The information sheet includes information identifying the predetermined amount and type of media loaded into the media cassette. The information sheet is inserted into the media cassette and the media cassette is sealed. The media cassette is installed into the terminal and the information on the information sheet is read to identify the predetermined amount and type of media in the installed media cassette. Finally, the status information in the terminal is updated to include the predetermined amount and type of media in the installed media cassette.

18 Claims, 3 Drawing Sheets

SYSTEM AND METHOD FOR AUTOMATICALLY LOADING AND PROCESSING MEDIA IN MEDIA CASSETTES

FIELD

The present disclosure relates to a system and method for automatically loading and processing media in media cassettes for an automated teller machine (ATM), and in particular, to a system and method which provides instructions for loading and processing the media via a media item included in the media cassette that has instructions that are read by a media item validator in the ATM when the media cassette is installed into the ATM.

BACKGROUND

Media cassettes are used in conjunction with a terminal such as an ATM in order to transport cash (bank notes) to the ATM and to hold the cash when installed in the ATM. Each media cassette is prepared in advance and information about the bank notes (i.e., replenishment data including count and denomination information) is manually entered at the terminal when the media cassette is installed into the ATM. Separate media cassettes are typically prepared and provided for each different denomination used by the ATM, requiring extra service time. Furthermore, manual entry of the replenishment data may lead to data entry errors and resultant confusion about the amount of cash held in the ATM.

There is thus a need for a system and method for automatically loading and processing media in media cassettes which overcomes the above problems.

SUMMARY

The present disclosure is addressed to a method for automatically loading and processing media in a media cassette at a terminal. A media cassette is loaded with a predetermined amount and type of media. The media has a common dimension. An information sheet is generated having a same dimension as the common dimension of the media. The information sheet includes information identifying the predetermined amount and type of media loaded into the media cassette. The information sheet is inserted into the media cassette and the media cassette is sealed. The media cassette is installed into the terminal and the information on the information sheet is read to identify the predetermined amount and type of media in the media cassette installed into the terminal.

Preferably, status information in the terminal may be updated to include the predetermined amount and type of media in the media cassette installed in the terminal. The media may consist of bank notes and the type of media may consist of a denomination of bank note.

In a further embodiment, the predetermined amount and type of media loaded into the media cassette may include a first predetermined amount and a first type of media and a second predetermined amount and a second type of media. All of the first type of media may be moved to a separate media cassette after reading the information sheet. The status information in the terminal may be updated to include the predetermined amount and type of second media in the media cassette installed in the terminal and to add the predetermined amount and type of first media added to the separate media cassette.

Preferably, the information on the information sheet may be encoded using one or more two-dimensional barcodes. Preferably, the information on the information sheet may be read by a note validator module in the terminal.

The present disclosure is also addressed to a terminal that includes a processor and a non-transitory computer readable storage medium comprising executable instructions that cause the processor to perform operations. The operations include, upon installation of a media cassette into the terminal, reading information on an information sheet included in the media cassette installed in the terminal upon loading with media, the information sheet having a same dimension as a common dimension of the media loaded in the media cassette, the information sheet including an identification of a predetermined amount and type of media loaded into the media cassette. The operations may also include updating status information in the terminal to include the predetermined amount and type of media in the media cassette installed in the terminal.

When the predetermined amount and type of media loaded into the media cassette includes a first predetermined amount and a first type of media and a second predetermined amount and a second type of media, the operations performed by the processor may include one or more of: causing all of the first type of media to be moved to a separate media cassette after the information sheet is read, updating status information in the terminal to include the predetermined amount and type of second media in the media cassette installed in the terminal; and updating status information in the terminal to add the predetermined amount and type of first media added to the separate media cassette.

The terminal may include a note validator module, and the information on the information sheet may be read by the note validator module.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
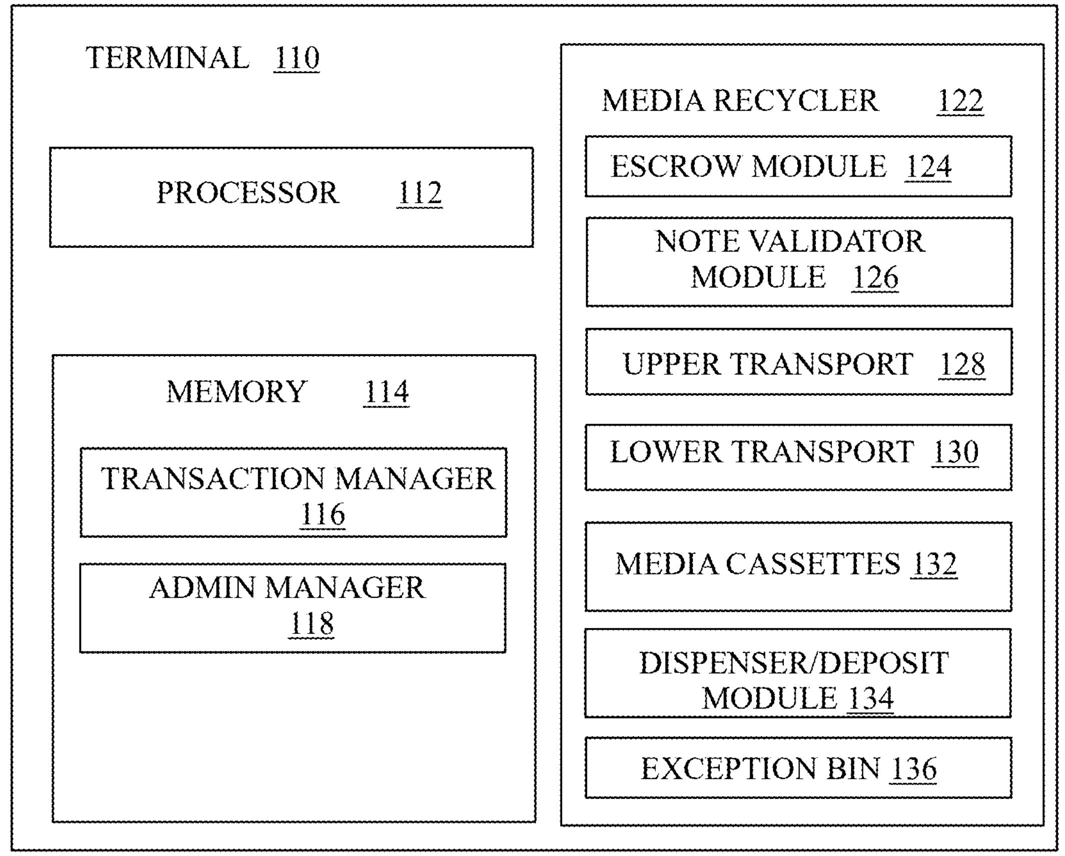
FIG. 1 is a block diagram of a system including a terminal implementing the method for automatically loading and processing media in media cassettes according to the present disclosure.

FIG. 1 is a diagram of a system 100 which includes a terminal 110 having a media recycler 122 configured for automatically loading and processing media in media cassettes according to an example embodiment. The terminal may be, for example, an automated teller machine, a self-service terminal, or a point-of-sale terminal. It is to be noted that the components are shown schematically in greatly simplified form, with only those components relevant to understanding of the embodiments being illustrated. Furthermore, the various components (that are identified in FIG.

1) are illustrated and the arrangement of the components is presented for purposes of illustration only.

Terminal 110 includes a processor 112 and a memory 114. Memory 114 is a non-transitory computer-readable storage medium. Memory 114 includes, inter alia, executable instructions for a transaction manager 116 and an admin manager 118. Processor 112 is configured to selectively execute the executable instructions from memory 114 in order to perform the operations discussed herein with respect to the transaction manager 116 and the admin manager 118. Each terminal 110 further includes a media recycler 122 having an escrow module 124, a note validator module 126, an upper transport 128, a lower transport 130, a plurality of media cassettes 132, a dispenser/deposit module 134, and an exception bin 136.

The escrow module 124 in the media recycler 122 temporarily stores bank notes being processed through the media recycler 122 as a transaction is processed. The upper transport 128 is a mechanism that transports bank notes either to the lower transport 130 for bank notes being deposited or out through the dispenser/deposit module 134 for bank notes being withdrawn from the media recycler 122. The lower transport 130 is a mechanism that transfers bank notes received from the upper transport 128 into a corresponding one of the media cassettes 132 based on information (i.e., the denomination of the note) from the note validator module 126. Lower transport 130 also transfers bank notes out of one or more of the media cassettes 132 to the upper transport 128 when the bank notes are to be dispensed through the dispenser/deposit module 134. The note validator module 126 processes each note and provides information about such note, including at least an indication as to the denomination of each note and may also provide an indication whether or not the note is fit for circulation (e.g., torn, dirty, ripped, or damaged bank notes are indicated as being not fit for circulation) and an indication whether the given note is genuine or counterfeit. The information from the note validator module 126 is provided to the lower transport 130 to identify which of the media cassettes 132 is to be used to store a given deposited note.

During currency deposits and withdrawals, transaction manager 116 controls the operation of the media recycler 122. During a withdrawal when $100 in bank notes is to be dispensed to a customer during a withdrawal, transaction manager 116 provides commands causing the lower transport 130 to obtain five $20 denomination bank notes from the corresponding one of media cassettes 132 designated to store such bank notes and then to provide those bank notes to the upper transport 128. The transaction manager 116 then causes upper transport 128 to divert the five $20 bank notes to the note validator module 126, which processes each note and forwards each note back to the upper transport 128. The transaction manager 116 then causes the upper transport 128 to forward the five $20 bank notes to the dispenser/deposit module 134 so that the customer can retrieve them. During a deposit, transaction manager 116 instructs the dispenser/deposit module 134 to forward deposited bank notes via the upper transport 128 to the note validator module 126. Under the control of the transaction manager 116, he note validator module 126 processes the deposited bank notes and then forwards the bank notes to the escrow module 124 and provides identifying the denomination and condition of each of the deposited bank notes. The deposited bank notes remain in the escrow module 124 until the customer confirms that the deposit should be completed. Upon such confirmation, the transaction manager 116 causes the bank notes to be transferred out of the escrow module 124, routed back through the note validator module 126, then to the upper transport 128, to the lower transport 130, and then into an appropriate one of the media cassettes 132 for the denomination of each of the bank notes.

Figure 2:
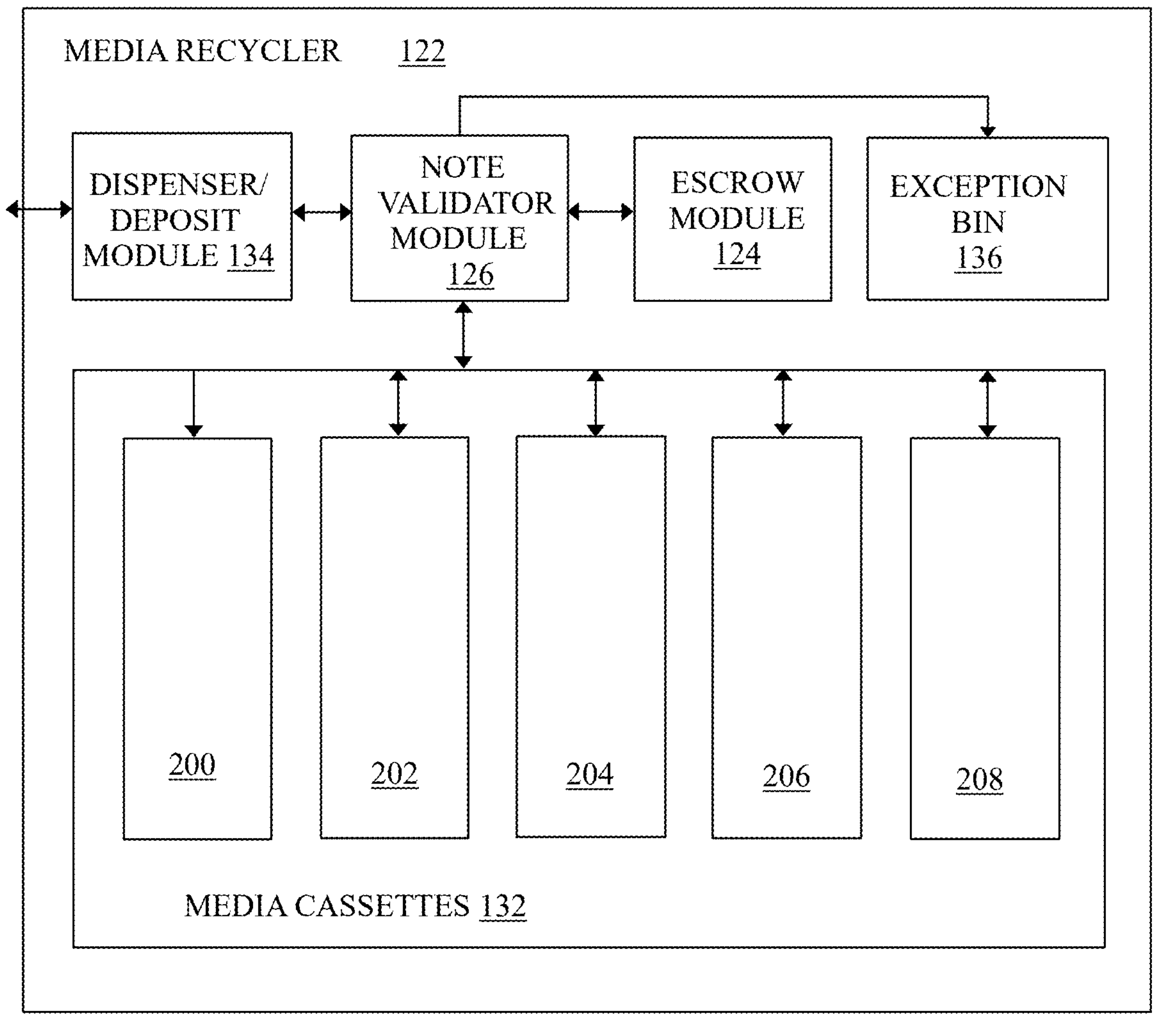
FIG. 2 is a simplified block diagram of the media recycler in the terminal shown in FIGS. 1.

Referring now to FIG. 2, a simplified version of the media recycler 122 is shown that omits the upper transport 128 and lower transport 130 and shows each separate media cassette among the media cassettes 132. A separate media cassette is provided for each denomination of bank note. In the embodiment shown in FIG. 2, media cassette 202 is designated to store $10 bank notes, media cassette 204 is designated to store $20 bank notes, media cassette 206 is designated to store $50 bank notes, and media cassette 208 is designated to store $100 bank notes. An additional storage cassette (i.e., "all-in" cassette 200) may be provided to store bank notes that are unfit for circulation (e.g., bank notes that are torn, dirty, ripped, or otherwise damaged). The all-in cassette 200 may also store deposited genuine and fit bank notes that are of denominations for which there is no corresponding cassette (e.g., a $1, $2 or $5 bank notes in the embodiment shown in FIG. 2). In the manner, it is evident that the bank notes stored in the all-in cassette 200 are not organized by denomination. The all-in cassette 200 only stores genuine bank notes, any counterfeit detected bank notes are moved to and stored in exception bin 136.

The admin manager 118 provides an administrative interface through which service personnel designate each of the media cassettes 132 as being associated with specific note denominations and/or designated as the all-in cassette 200, and also provides for the entry of replenishment data when a new media cassette is installed. During use of terminal 110 in accepting bank note depositions and providing bank note withdrawals, the admin manager 118 maintains a count per denomination present in each of media cassettes 132 designated to hold separate denominations (i.e., media cassettes 202, 204, 206, 208 in FIG. 1) as the media recycler 122 of terminal 110. The admin manager 118 also maintains information about the denomination designated for each of the media cassettes 132 and a cassette identifier for the all-in cassette 200. Admin manager 118 may provide such metrics in real time to service personnel through a service interface. At any given point in time, an operator associated with a given terminal 110 can obtain, cassette identifiers for each of the media cassettes 132 designated to store separate denominations of bank notes, the known bank note capacity for each of the media cassettes 132, the denomination of bank notes stored for each of the media cassettes 132, a total number of bank notes currently stored in for each of the media cassettes 132, and a cassette identifier for the all-in cassette 200 among the media cassettes 132. The admin manager 118 is also responsible for initiating the automatic loading and processing of the media in a newly loaded media cassette according to aspects of the present disclosure.

Figure 3:
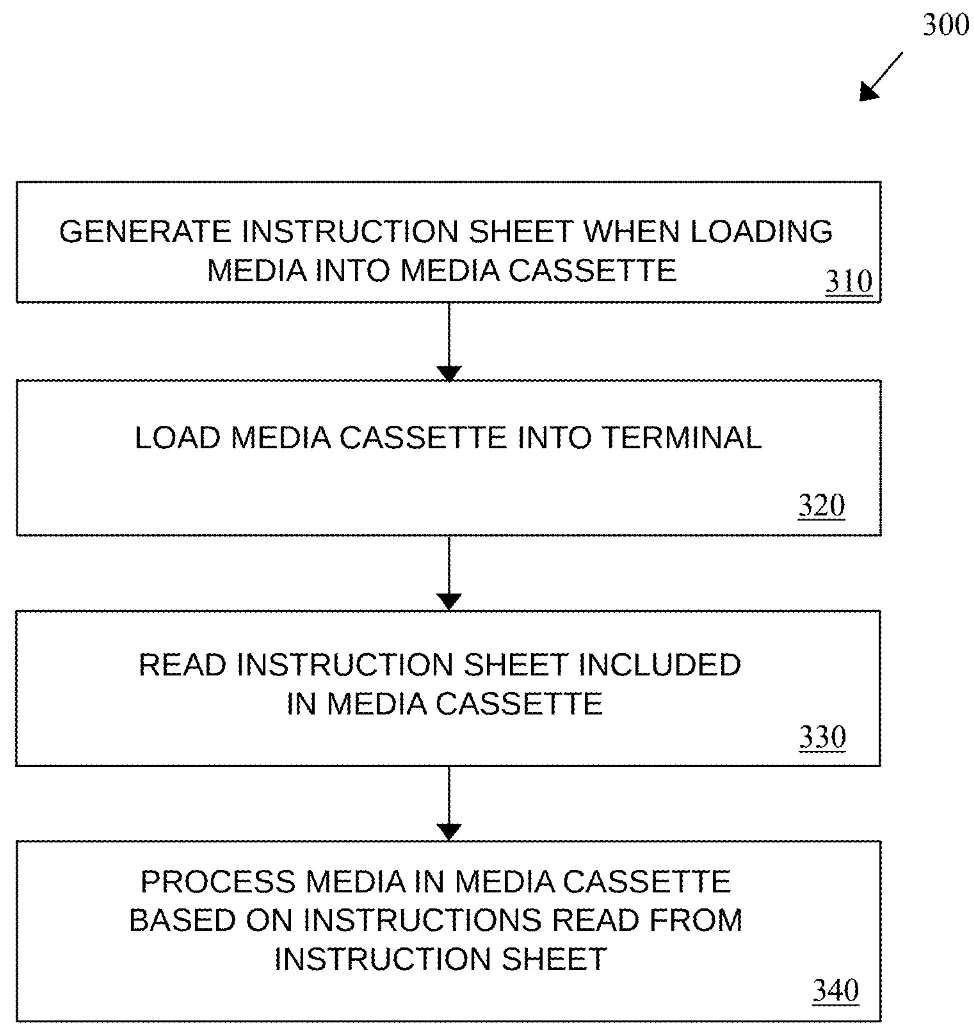
FIG. 3 is flow chart of the methods for automatically loading and processing media in media cassettes according to the present disclosure.

Referring now to the flowchart 300 in FIG. 3, in a first step 310, when a media cassette is prepared, at a control cash environment, for delivery to a terminal 110, an instruction sheet is prepared which includes instructions on loading and processing the media (bank notes) within such media cassette. This instruction sheet may be encoded, using for example one or more two-dimensional barcodes such as QR codes. The instructions may identify the number of and a single denomination for the bank notes included in the media cassette, when only one denomination of bank note is included. The instructions may include a breakdown of number and denomination for the bank notes, when more than one denomination is provided. The instruction sheet is formed on paper having the same size as the bank notes and is preferably positioned as the top item in the stack of media items (bank notes) in the media cassette. Once the instruction sheet is inserted, the media cassette is sealed.

Next, at step 320, the media cassette is installed into the terminal 110 by a service person. Once the media cassette is installed, at step 330, admin manager 120 causes the lower transport 130 and the upper transport 128 to move automatically the first media item (the instruction sheet) from the installed media cassette to the note validator module 126. The note validator module 126 is configured to read the encoded instructions, e.g., the two-dimensional barcode(s), and provide such instructions to the admin module 118. Once the instruction sheet is read, it can be returned to the service person via the dispenser/deposit module 134 or forwarded to the exception bin 136.

Finally, at step 340, the admin module 118 receives the instructions and takes such action to process the media in the installed media cassette based such instructions. For example, the admin module 118 may cause all of the media items in the installed media cassette to be run through the note validator module 126 in order to confirm the information from the encoded instructions and then returned to the installed media cassette. The admin module 118 may cause a number of the media items (the number included in the encoded instructions) in the installed media cassette to be run through the note validator module 126 and then moved to a different installed media cassette, when the information in the encoded instructions indicate that more than one denomination of bank note is included in the installed media cassette. This is repeated as necessary based on the instructions, and then, once the media items are properly distributed among the media cassettes installed in the terminal, the new counts may be verified (by running each bank note through the note validator module 126) for each updated media cassette, and then the stored count information is updated. The information within the instructions may also be provided to the service person, e.g., via the customer display on the terminal 110, or a custom service internal display thereon, in order to provide feedback used to ensure that the correct media cassette was loaded.

The disclosed system and method provide for end-to-end verification of the cash replenishment process for an ATM which leads to a significant reduction of erroneous load information and minimizes servicing time using existing recycler technology The disclosed system and method allows for the cash load to be verified upon insertion of the new media cassette and allows for more complex replenishment instructions (e.g., different denominations) to be passed error-free to the ATM directly from the controlled cash center environment. The disclosed system and method ensures that all information necessary for loading the media cassette is accurately entered into the terminal during the replenishment operation, enhancing overall efficiency and reliability.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method for automatically loading and processing media in a media cassette at a terminal, comprising:

loading a media cassette with a predetermined amount and type of media, the media having a common dimension;

generating an information sheet having a same dimension as the common dimension of the media, the information sheet including information identifying the predetermined amount and type of media loaded into the media cassette;

inserting the information sheet into the media cassette with the media items and sealing the media cassette;

installing the media cassette into the terminal;

reading, by a note validator module in the terminal, the information on the information sheet to identify the predetermined amount and type of media in the media cassette installed into the terminal, wherein the note validator module is also configured to process the media items to identify denominations thereof; and processing the media items in the installed media cassette in the terminal based on the information read from the information sheet.

2. The method of claim 1, further comprising updating status information in the terminal to include the predetermined amount and type of media in the media cassette installed in the terminal.

3. The method of claim 1, wherein the media consists of bank notes and the type of media consists of a denomination of bank note.

4. The method of claim 1, wherein the predetermined amount and type of media loaded into the media cassette includes a first predetermined amount and a first type of media and a second predetermined amount and a second type of media.

5. The method of claim 4, wherein the media consists of bank notes, the first type of media consists of a first denomination of bank note, and the second type of media consists of a second denomination of bank note.

6. The method of claim 4, further comprising moving all of the first type of media to a separate media cassette after reading the information sheet.

7. The method of claim 6, further comprising updating status information in the terminal to include the predetermined amount and type of second media in the media cassette installed in the terminal.

8. The method of claim 6, further comprising updating status information in the terminal to add the predetermined amount and type of first media added to the separate media cassette.

9. The method of claim 1, wherein the information on the information sheet is encoded using one or more two-dimensional barcodes.

10. A terminal, comprising:

a note validator module configured to:

read information on an information sheet to identify a predetermined amount and type of media in a media cassette installed into the terminal, and process media items to identify denominations thereof;

a processor; and a non-transitory computer readable storage medium comprising executable instructions that cause the processor to perform operations comprising:

upon installation of the media cassette into the terminal, causing the note validator module to read the information on the information sheet included in the media cassette with the media items loaded therein, the information sheet having a same dimension as a common dimension of the media loaded in the media cassette, the information on the information sheet identifying a predetermined amount and type of media loaded into the media cassette.

11. The terminal of claim 10, wherein the non-transitory computer readable storage medium comprises executable instructions that cause the processor to update status information in the terminal to include the predetermined amount and type of media in the media cassette installed in the terminal.

12. The terminal of claim 10, wherein the media consists of bank notes and the type of media consists of a denomination of bank note.

13. The terminal of claim 10, wherein the predetermined amount and type of media loaded into the media cassette includes a first predetermined amount and a first type of media and a second predetermined amount and a second type of media.

14. The terminal of claim 13, wherein the media consists of bank notes, the first type of media consists of a first denomination of bank note, and the second type of media consists of a second denomination of bank note.

15. The terminal of claim 13, wherein the non-transitory computer readable storage medium comprises executable instructions that cause the processor to cause all of the first type of media to be moved to a separate media cassette after the information sheet is read.

16. The terminal of claim 15, wherein the non-transitory computer readable storage medium comprises executable instructions that cause the processor to update status information in the terminal to include the predetermined amount and type of second media in the media cassette installed in the terminal.

17. The terminal of claim 15, wherein the non-transitory computer readable storage medium comprises executable instructions that cause the processor to update status information in the terminal to add the predetermined amount and type of first media added to the separate media cassette.

18. The terminal of claim 10, wherein the information on the information sheet is encoded using one or more two-dimensional barcodes.

* * * * *